US012097715B2

(12) United States Patent
Kato et al.

(10) Patent No.: US 12,097,715 B2
(45) Date of Patent: Sep. 24, 2024

(54) THERMAL HEAD AND THERMAL PRINTER

(71) Applicant: KYOCERA CORPORATION, Kyoto (JP)

(72) Inventors: Kenichi Kato, Kirishima (JP); Makoto Miyamoto, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 100 days.

(21) Appl. No.: 17/907,673

(22) PCT Filed: Mar. 26, 2021

(86) PCT No.: PCT/JP2021/013060
§ 371 (c)(1),
(2) Date: Sep. 29, 2022

(87) PCT Pub. No.: WO2021/200729
PCT Pub. Date: Oct. 7, 2021

(65) Prior Publication Data

US 2023/0130610 A1 Apr. 27, 2023

(30) Foreign Application Priority Data

Mar. 31, 2020 (JP) ................................ 2020-065270

(51) Int. Cl.
*B41J 2/335* (2006.01)
*B41J 2/345* (2006.01)

(52) U.S. Cl.
CPC ......... *B41J 2/3351* (2013.01); *B41J 2/33505* (2013.01); *B41J 2/3352* (2013.01); *B41J 2/33535* (2013.01); *B41J 2/3354* (2013.01); *B41J 2/345* (2013.01); *B41J 2/33515* (2013.01); *B41J 2/33525* (2013.01); *B41J 2/3353* (2013.01); *B41J 2/3357* (2013.01)

(58) Field of Classification Search
CPC .... B41J 2/3351; B41J 2/33505; B41J 2/3352; B41J 2/33535; B41J 2/3354; B41J 2/345; B41J 2/33515; B41J 2/33525; B41J 2/3353; B41J 2/3357
See application file for complete search history.

(56) References Cited

U.S. PATENT DOCUMENTS

| | | | | | |
|---|---|---|---|---|---|
| 2002/0149117 | A1 | 10/2002 | Shibata | | |
| 2003/0011069 | A1* | 1/2003 | Shibata | H01L 24/05 | 257/737 |
| 2007/0285465 | A1* | 12/2007 | Shibata | B41J 2/1753 | 347/47 |

FOREIGN PATENT DOCUMENTS

| | | | | |
|---|---|---|---|---|
| JP | H5229160 | A | 9/1993 | |
| JP | H7329329 | A | 12/1995 | |
| JP | 2002289768 | A | 10/2002 | |
| JP | 2002321399 | A | 11/2002 | |
| JP | 2012206417 | A | * 10/2012 | B41J 2/345 |
| JP | 2016185675 | A | * 10/2016 | B41J 2/335 |

* cited by examiner

*Primary Examiner* — Yaovi M Ameh
(74) *Attorney, Agent, or Firm* — HAUPTMAN HAM, LLP

(57) ABSTRACT

A thermal head includes a substrate, a bonding material, an electrically conductive member, and a gold electrode. The bonding material is located on the substrate and contains gold and tin. The electrically conductive member is located on the bonding material. The gold electrode is located on the substrate and electrically connected to the bonding material.

20 Claims, 5 Drawing Sheets

THERMAL HEAD AND THERMAL PRINTER

RELATED APPLICATIONS

The present application is a National Phase of International Application Number PCT/JP2021/013060 filed Mar. 26, 2021, and claims priority of Japanese Application Number 2020-065270 filed Mar. 31, 2020.

TECHNICAL FIELD

Embodiments of this disclosure relate to a thermal head and a thermal printer.

BACKGROUND OF INVENTION

Various kinds of thermal heads for printing devices such as facsimile machines and video printers have been proposed in the related art.

An electronic component connection structure in which an AuSn alloy layer is sandwiched between and bonded to an Au bump located on the wiring side on the substrate and an Au bump located on the electronic component side has been proposed.

CITATION LIST

Patent Literature

Patent Literature 1: JP 2002-289768 A

SUMMARY

A thermal head in an aspect of an embodiment includes a substrate, a bonding material, an electrically conductive member, and a gold electrode. The bonding material is located on the substrate and contains gold and tin. The electrically conductive member is located on the bonding material. The gold electrode is located on the substrate and is electrically connected to the electrically conductive member via the bonding material.

In an aspect of the present disclosure, a thermal printer includes the thermal head described above, a transport mechanism, and a platen roller. The transport mechanism transports a recording medium on a heat generating part located on the substrate. The platen roller presses the recording medium.

DESCRIPTION OF EMBODIMENTS

Embodiments of a thermal head and a thermal printer disclosed in the present application will be described below with reference to the accompanying drawings. Note that this invention is not limited to each of the embodiments that will be described below.

Embodiments

Figure 1:
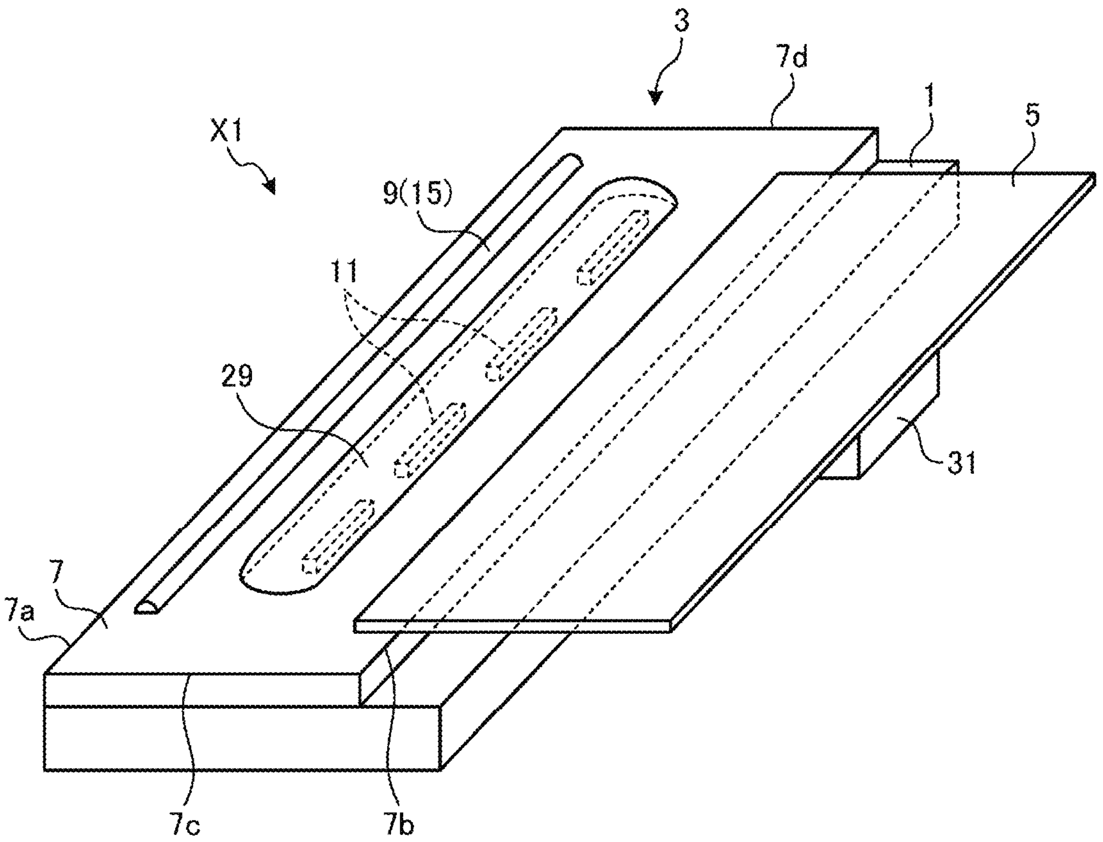
FIG. 1 is a perspective view schematically illustrating a thermal head according to an embodiment.

FIG. 1 is a perspective view schematically illustrating a thermal head according to an embodiment. In the embodiment, a thermal head X1 includes a heat dissipation body 1, a head base 3, and a flexible printed circuit board (FPC) 5 as illustrated in FIG. 1. The head base 3 is located on the heat dissipation body 1. The FPC 5 is electrically connected to the head base 3. The head base 3 includes a substrate 7, a heat generating part 9, a drive IC 11, and a covering member 29.

The heat dissipation body 1 has a plate-like shape and has a rectangular shape in plan view. The heat dissipation body 1 has a function of dissipating the heat generated by the heat generating part 9 of the head base 3, especially heat not contributing to printing. The head base 3 is bonded to an upper surface of the heat dissipation body 1 using a double-sided tape, an adhesive, or the like (not illustrated). The heat dissipation body 1 is made of, for example, a metal material such as copper, iron, or aluminum.

The head base 3 has a plate-like shape and has a rectangular shape in plan view. The head base 3 includes each member constituting the thermal head X1 located on the substrate 7. The head base 3 performs printing on a recording medium P (see FIG. 6) according to an electrical signal supplied from outside.

A plurality of drive ICs 11 are located on the substrate 7 and arranged in a main scanning direction. The drive ICs 11 are electronic components having a function of controlling a conductive state of the heat generating part 9. A switching member including a plurality of switching elements inside, for example, may be used for the drive IC 11.

The drive IC 11 is covered by a covering member 29 made of a resin such as an epoxy resin or a silicone resin. The covering member 29 is located across the plurality of drive ICs 11.

The FPC 5 is electrically connected to the head base 3 at one end and is electrically connected to a connector 31 at the other end.

Figure 2:
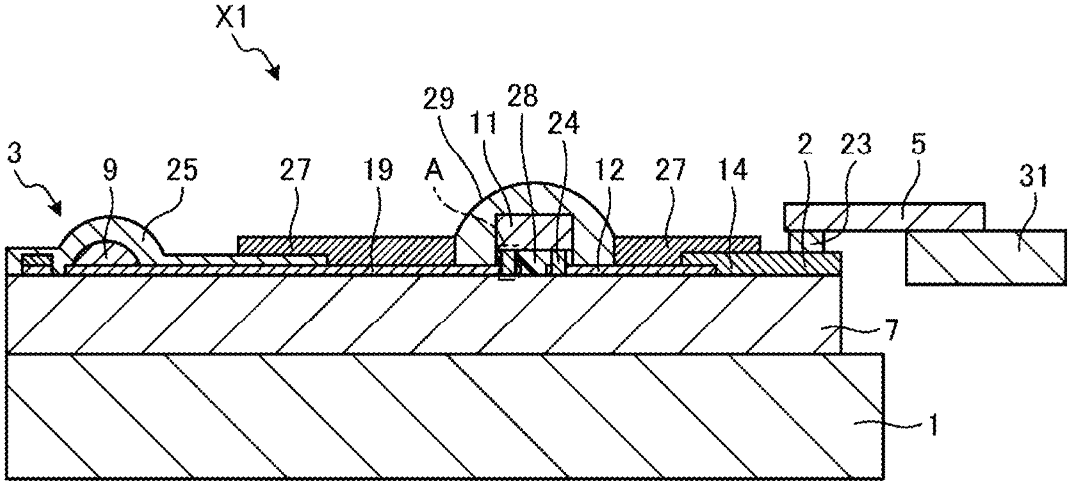
FIG. 2 is a cross-sectional view schematically illustrating the thermal head illustrated in FIG. 1.

The FPC 5 is electrically connected to the head base 3 using an electrically conductive bonding material 23 (see FIG. 2). An example of the electrically conductive bonding material 23 may include a solder material or an anisotropic conductive film (ACF) in which electrically conductive particles are mixed into an electrically insulating resin.

Figure 3:
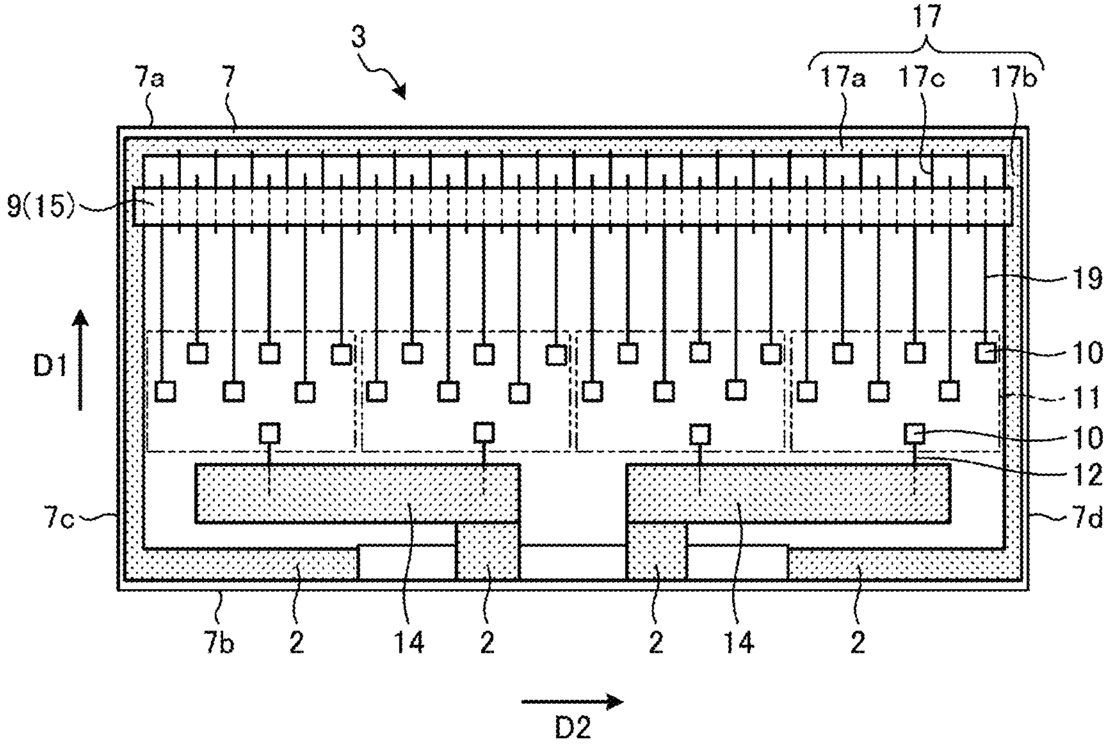
FIG. 3 is a plan view schematically illustrating a head base illustrated in FIG. 1.

Hereinafter, each of the members constituting the head base 3 will be described using FIGS. 1 to 3. FIG. 2 is a cross-sectional view schematically illustrating the thermal head illustrated in FIG. 1. FIG. 3 is a plan view schematically illustrating the head base illustrated in FIG. 1.

The head base 3 further includes the substrate 7, a common electrode 17, an individual electrode 19, a first electrode 12, a second electrode 14, a terminal 2, a heat generating resistor 15, a protective layer 25, a covering layer 27, a bonding material 24, and an underfill material 28. Note that, in FIG. 1, the protective layer 25 and the covering layer 27 are omitted. FIG. 3 illustrates wiring of the head base 3 in a simplified manner, in which the protective layer 25, the covering layer 27, and the underfill material 28 are omitted. In FIG. 3, a configuration of the second electrode 14 is illustrated in a simplified manner, and the drive ICs 11 are indicated in an approximate shape in plan view with alternate long and two short dashed lines.

The substrate 7 has a rectangular shape in plan view. The substrate 7 has a first long side 7*a* that is one long side, a second long side 7*b* that is the other long side, a first short side 7*c*, and a second short side 7*d*. The substrate 7 is made of an electrically insulating material such as an alumina ceramic or a semiconductor material such as monocrystalline silicon.

The common electrode 17 is located on an upper surface of the substrate 7 as illustrated in FIG. 2. The common electrode 17 is made of an electrically conductive material, and examples thereof include at least one metal selected from aluminum, gold, silver, and copper, or an alloy of these metals.

The common electrode 17 includes a first common electrode 17*a*, a second common electrode 17*b*, a third common electrode 17*c*, and the terminal 2 as illustrated in FIG. 3. The common electrode 17 is electrically connected in common to the heat generating part 9 including a plurality of elements.

The first common electrode 17*a* is located between the first long side 7*a* of the substrate 7 and the heat generating part 9, and extends in the main scanning direction. The plurality of second common electrodes 17*b* are located respectively along the first short side 7*c* and the second short side 7*d* of the substrate 7. Each of the plurality of second common electrodes 17*b* connects the corresponding terminal 2 and the first common electrode 17*a*. Each of the third common electrodes 17*c* extends from the first common electrode 17*a* toward a corresponding element of the heat generating part 9, and a part of the third common electrode 17*c* extends through the heat generating part 9 to the side opposite to the heat generating part 9. The third common electrodes 17*c* are located at intervals in a second direction D2 (the main scanning direction).

The individual electrode 19 is located on the upper surface of the substrate 7. The individual electrode 19 is a so-called gold electrode. The individual electrode 19 contains gold or a gold alloy, for example, and thus have electrical conductivity. The individual electrode 19 may contain tin. A plurality of individual electrodes 19 are located in the main scanning direction and each of them is located between adjacent third common electrodes 17*c*. As a result, in the thermal head X1, the third common electrodes 17*c* and the plurality of individual electrodes 19 are alternately arranged in the main scanning direction. Each individual electrode 19 is connected to an electrode pad 10 at a portion close to the second long side 7*b* of the substrate 7. The electrode pad 10 is electrically connected to the drive ICs 11 by the bonding material 24 (see FIG. 2). The electrode pad 10 may be made of the same material as the individual electrode 19, for example.

The first electrode 12 is connected to the electrode pad 10, and extends in a first direction D1 (a sub scanning direction). The drive IC 11 is mounted on the electrode pad 10 as described above. The electrode pad 10 may be made of the same material as the first electrode 12, for example.

The second electrode 14 extends in the main scanning direction and is located over a plurality of first electrodes 12. The second electrode 14 is connected to the outside via the terminal 2.

The terminal 2 is located on the second long side 7*b* side of the substrate 7. The terminal 2 is connected to the FPC 5 via the electrically conductive bonding material 23 (see FIG. 2). In this way, the head base 3 is electrically connected to the outside.

The above-described third common electrode 17*c*, individual electrode 19, and first electrode 12 can be formed by forming a material layer constituting each of the electrodes on the substrate 7 by using, for example, a screen printing method, a flexographic printing method, a gravure printing method, a gravure offset printing method, or the like. The above-described electrodes may be formed, for example, by sequentially layering the electrodes using a known thin film forming technique such as a sputtering method, and then processing the layered body into a predetermined pattern by using known photoetching, or the like. The third common electrode 17*c*, the individual electrode 19, and the first electrode 12 have a thickness of, for example, approximately from 0.3 to 10 μm, or for example, approximately from 0.5 to 5 μm.

The above-described first common electrode 17*a*, second common electrode 17*b*, the second electrode 14, and the terminal 2 can be formed by forming a material layer constituting each of the electrodes on the substrate 7 using, for example, a screen printing method. The first common electrode 17*a*, the second common electrode 17*b*, the second electrode 14, and the terminal 2 have a thickness of, for example, approximately from 5 to 20 μm. By forming the thick electrode in this manner, the wiring resistance of the head base 3 can be reduced. Note that the portion of the thick electrode is illustrated by dots in FIG. 3.

The heat generating resistor 15 is located across the third common electrode 17*c* and the individual electrode 19 and spaced apart from the first long side 7*a* of the substrate 7. A portion of the heat generating resistor 15 located between the third common electrode 17*c* and the individual electrode 19 functions as each element of the heat generating part 9. Although each element of the heat generating part 9 is illustrated in a simplified manner in FIG. 3, the elements are located at a density from, for example, 100 dpi to 2400 dpi (dot per inch) or the like.

The heat generating resistor 15 may be formed, for example, by placing a material paste containing ruthenium oxide as a conductive component on the substrate 7 including the patterned various electrodes in a long strip-like shape elongated in the main scanning direction using a screen printing method or a dispensing device.

The protective layer 25 is located on a heat storage layer 13 formed on the upper surface of the substrate 7 to cover the heat generating part 9. The protective layer 25 is located extending from the first long side 7*a* of the substrate 7 but separated from the electrode pad 10 and extending in the main scanning direction of the substrate 7.

The protective layer 25 has an insulating property and protects the covered region from corrosion due to deposition of moisture and the like contained in the atmosphere, or from wear due to contact with the recording medium to be printed. The protective layer 25 can be made of, for example, glass using a thick film forming technique such as printing.

The protective layer 25 may be formed using SiN, $SiO_2$, SiON, SiC, diamond-like carbon, or the like. Note that the protective layer 25 may be a single layer or be formed by layering a plurality of protective layers 25. The protective layer 25 such as that described above can be formed using a thin film forming technique such as a sputtering method.

The covering layer 27 is located on the substrate 7 such that the covering layer partially covers the common electrode 17, the individual electrode 19, the first electrode 12, and the second electrode 14. The covering layer 27 protects the covered region from oxidation due to contact with the atmosphere or from corrosion due to deposition of moisture and the like contained in the atmosphere. The covering layer 27 can be made of a resin material such as an epoxy resin, a polyimide resin, or a silicone resin.

The bonding material 24 is located on the substrate 7, and electrically connects the drive IC 11 and the individual electrode 19. The bonding material 24 contains gold (Au) and tin (Sn), and has electrical conductivity. Note that bonding of the drive ICs 11 by the bonding material 24 will be described in detail later.

The underfill material 28 is located between the substrate 7 and the drive IC 11, and covers a part of the bonding material 24 and the drive ICs 11. The underfill material 28 has insulating properties. The underfill material 28 can be made of, for example, a resin such as an epoxy resin.

Note that, although the substrate 7 has been described as a single layer, it may have a layered structure in which the heat storage layer is located on the upper surface. The heat storage layer can be located over the entire region on the upper surface side of the substrate 7. The heat storage layer is made of glass having low thermal conductivity, for example. The heat storage layer temporarily stores part of the heat generated by the heat generating part 9, which can shorten the time required to increase the temperature of the heat generating part 9. This functions to enhance the thermal response properties of the thermal head X1.

The heat storage layer is made by, for example, applying a predetermined glass paste obtained by mixing glass powder with an appropriate organic solvent onto the upper surface of the substrate 7 using a known screen printing method or the like in the related art, and firing the upper surface.

Note that the heat storage layer may include an underlying portion and a raised portion. In this case, the underlying portion is located across the entire upper surface of the substrate 7. The raised portion protrudes from the underlying portion in the thickness direction of the substrate 7, and extends in a strip shape in the second direction D2 (the main scanning direction). In this case, the raised portion functions to favorably press the recording medium to be printed against the protective layer 25 formed on the heat generating part 9. Note that the heat storage layer may include only the raised portion.

Figure 4:
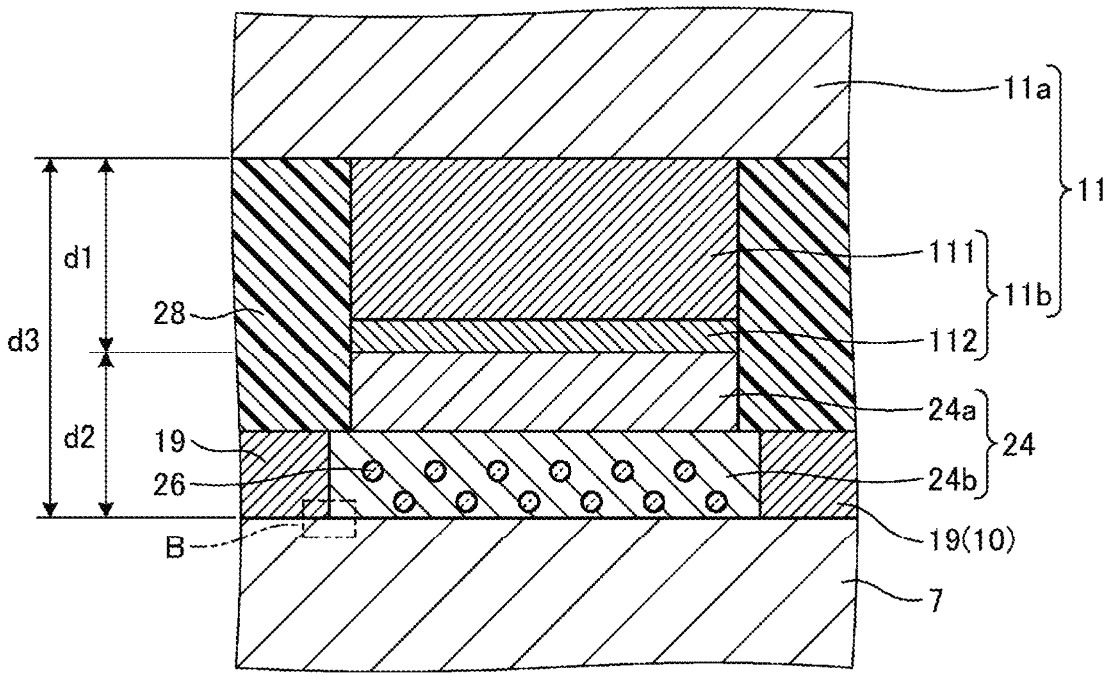
FIG. 4 is an enlarged cross-sectional view of a region A illustrated in FIG. 2.

The main portion of the thermal head X1 according to an embodiment will be described in detail with reference to FIG. 4. FIG. 4 is an enlarged cross-sectional view of a region A illustrated in FIG. 2.

Each drive IC 11 includes an element portion 11*a* and a terminal portion 11*b* as illustrated in FIG. 4. The element portion 11*a* is a main portion that achieves the above-described functions of the drive IC 11. The element portion 11*a* is an example of an electronic component.

The terminal portion 11*b* is electrically connected to the element portion 11*a*. The terminal portion 11*b* is electrically connected to the electrode pad 10 located at an end portion of the individual electrode 19 via the bonding material 24 located on the substrate 7. The terminal portion 11*b* is, for example, an electrically conductive metal member. The terminal portion 11*b* contains, for example, copper and nickel. The terminal portion 11*b* is an example of an electrically conductive member.

The terminal portion 11*b* may include a first layer 111 and a second layer 112. The first layer 111 contains, for example, copper. The first layer 111 has a predetermined dimension and ensures an interval d3 between the element portion 11*a* and the substrate 7. The interval d3 is, for example, 20 μm or greater.

The second layer 112 is located closer to the substrate 7 than the first layer 111. The second layer 112 contains, for example, nickel. The second layer 112 functions as an anti-diffusion layer that suppresses diffusion of gold atoms and tin atoms contained in the bonding material 24 toward the element portion 11*a* side.

A thickness d1 of the terminal portion 11*b* may be greater than an interval d2 between the substrate 7 and the terminal portion 11*b*. When the thickness d1 is greater than the interval d2, the above-described interval d3 between the element portion 11*a* and the substrate 7 is easily ensured.

The bonding material 24 is located between the substrate 7 and the terminal portion 11*b* of the drive IC 11, and fixes the drive IC 11 onto the substrate 7.

The bonding material 24 is located on the substrate 7 whiling coming in contact with and being adjacent to the individual electrode 19. Thus, the drive IC 11 and the individual electrode 19 are electrically connected via the bonding material 24 having electrical conductivity.

The bonding material 24 is located directly on the substrate 7 without having the individual electrode 19 therebetween. The durability becomes higher when the bonding material 24 is located as described above. This point will be described using FIGS. 4 and 5.

Figure 5:
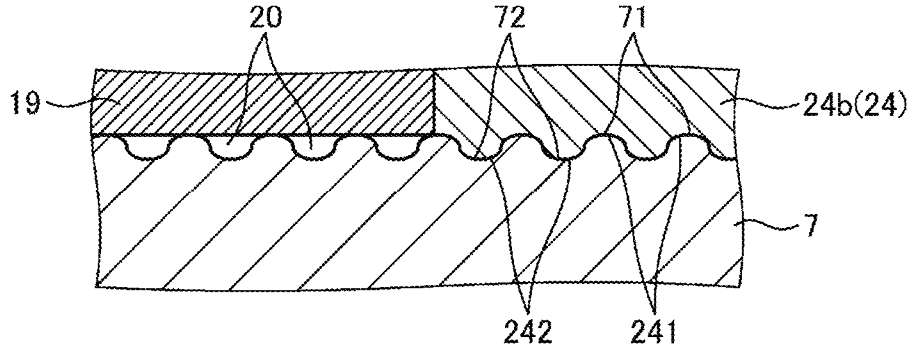
FIG. 5 is an enlarged cross-sectional view of a region B illustrated in FIG. 4.

FIG. 5 is an enlarged cross-sectional view of a region B illustrated in FIG. 4. The substrate 7 includes a plurality of protruding portions 71 and recessed portions 72 facing the individual electrodes 19 and the bonding material 24 as illustrated in FIG. 5. The protruding portions 71 protrude in the thickness direction of the substrate 7. Each of the recessed portions 72 is located between adjacent protruding portions 71 and recessed in the thickness direction of the substrate 7. Note that the protruding portions 71 and the recessed portions 72 can be defined as follow. An average height Zc of the surface of the substrate 7 is measured in a predetermined distance (e.g., 300 μm) in the cross-section of the substrate 7 in FIG. 5. The portions having a greater height than the average height Zc are regarded as the protruding portions 71, and the portions having a lower height than the average height Zc are regarded as the recessed portions 72.

The individual electrode 19 comes in contact with the protruding portions 71. On the other hand, a gap 20 is located between each of the recessed portions 72 of the substrate 7 and the individual electrode 19. That is, the individual electrode 19 is fixed on the substrate 7 and supported by the protruding portions 71.

Meanwhile, the bonding material 24 includes a plurality of recessed portions 241 and protruding portions 242. The recessed portions 241 are located at a periphery of each of the protruding portions 71 to surround each of the protruding portions 71 of the substrate 7 in plan view. The protruding portions 242 are located in the recessed portions 72 of the substrate 7. That is, the bonding material 24 is positioned to conform to the surface profile of the substrate 7, and thus the bonding material 24 and the substrate 7 adhere to each other.

Since the bonding material 24 includes the recessed portions 241 and the protruding portions 242 corresponding respectively to the protruding portions 71 and the recessed portions 72 of the substrate 7 as described above, the adhesiveness of the bonding material 24 to the substrate 7 is higher than that of the individual electrodes 19 not conforming to the protruding portions 71 and the recessed portions 72 of the substrate 7. For this reason, peeling or breakage of the bonding material 24 fixing the drive IC 11 is less likely to occur. As a result, in the embodiment, the thermal head X1 has improved durability.

Returning to FIG. 4, further description will be provided. The bonding material 24 may include a first region 24*a* and a second region 24*b*. The first region 24*a* has a higher content of tin than the individual electrode 19. Specifically, the first region 24_a_ may have, for example, Sn atoms at a mass ratio of from 20% to 40% and Au atoms at a mass ratio of from 80% to 60%.

The second region 24_b_ has a higher content of gold than the first region 24_a_. Specifically, the second region 24_b_ may have, for example, Sn atoms at a mass ratio lower than 20% and Au atoms at a mass ratio exceeding 80%. The first region 24_a_ and the second region 24_b_ can be determined by visual observation based on a scanning electron microscope (SEM) image obtained by capturing a cross-section of the bonding material 24.

The second region 24_b_ extends from below the terminal portion 11_b_ in the lateral direction of FIG. 4.

The second region 24_b_ may be located closer to the substrate 7 side than the first region 24_a_. The first region 24_a_ may face the terminal portion 11_b_ of the drive IC 11, and the second region 24_b_ may be adjacent to the individual electrode 19, for example, as illustrated in FIG. 4.

The bonding material 24 may contain a glass component 26. The glass component 26 is located, for example, inside the second region 24_b_. For example, when the glass component 26 is partially located in the protruding portions 242 (see FIG. 5) of the bonding material 24, the glass component 26 easily comes in contact with or is brought close to the recessed portions 72 of the substrate 7. The glass component 26 located in this manner further enhances the adhesiveness of the bonding material 24 to the substrate 7 due to an anchor effect. For this reason, peeling or breakage of the bonding material 24 fixing the drive IC 11 is less likely to occur. As a result, in the embodiment, the thermal head X1 has improved durability.

Note that, although not illustrated, the connection of the drive IC 11 to the electrode pad 10 located in the first electrode 12 can be the same as and/or similar to the connection of the drive IC 11 to the electrode pad 10 located at the end portion of the individual electrode 19 described above, which is an example of a gold electrode.

Figure 6:
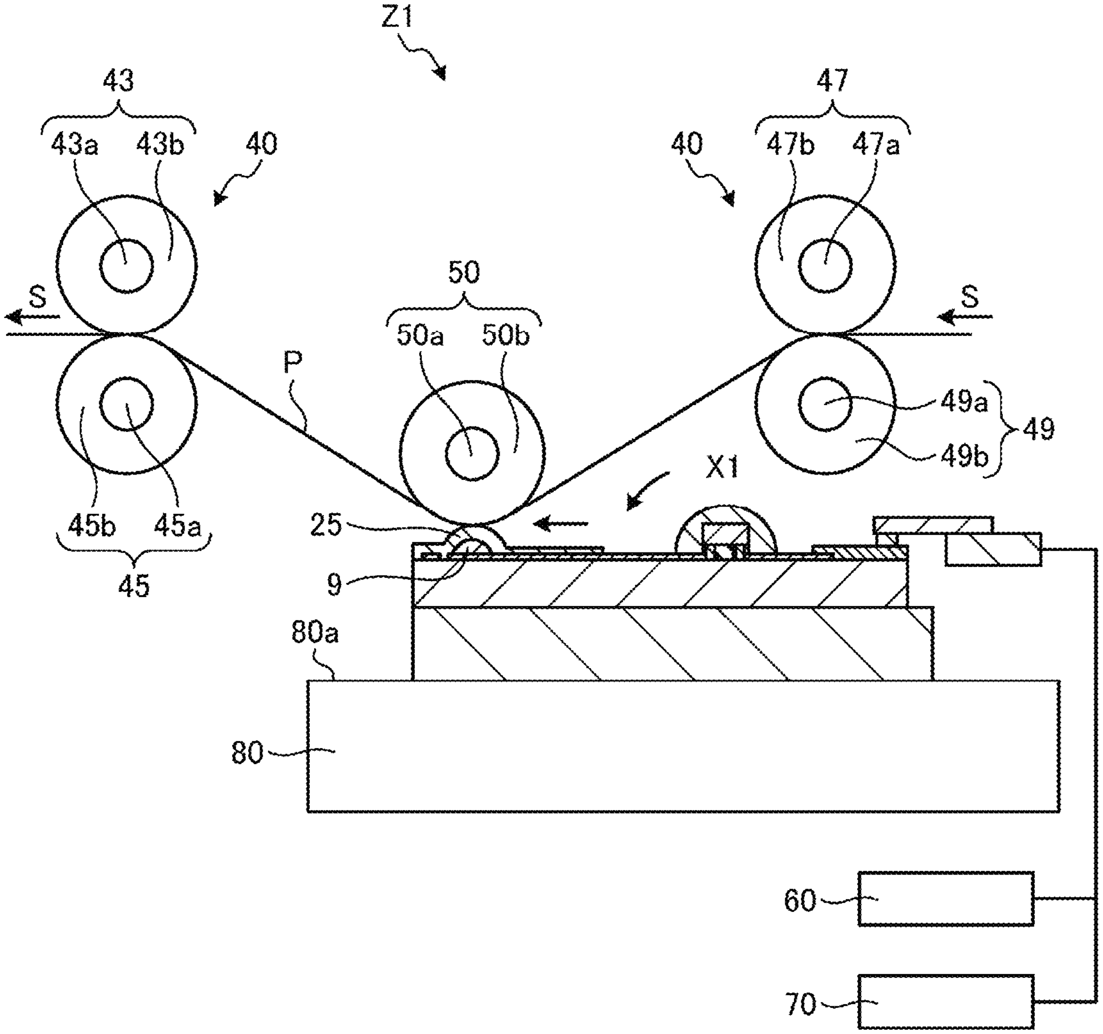
FIG. 6 is a schematic view of a thermal printer according to an embodiment.

A thermal printer Z1 including the thermal head X1 will be described with reference to FIG. 6. FIG. 6 is a schematic view of a thermal printer according to an embodiment.

In the present embodiment, the thermal printer Z1 includes the above-described thermal head X1, a transport mechanism 40, a platen roller 50, a power supply device 60, and a control device 70. The thermal head X1 is attached to a mounting surface 80_a_ of a mounting member 80 disposed in a housing (not illustrated) of the thermal printer Z1. Note that the thermal head X1 is attached to the mounting member 80 such that the thermal head is aligned in the main scanning direction orthogonal to a transport direction S.

The transport mechanism 40 includes a drive unit (not illustrated) and transport rollers 43, 45, 47, and 49. The transport mechanism 40 transports a recording medium P, such as heat-sensitive paper or image-receiving paper to which ink is to be transferred, on the protective layer 25 located on a plurality of heat generating parts 9 of the thermal head X1 in the transport direction S indicated by an arrow. The drive unit has a function of driving the transport rollers 43, 45, 47, and 49, and a motor can be used for the drive unit, for example. The transport rollers 43, 45, 47, and 49 may be configured by, for example, covering cylindrical shaft bodies 43_a_, 45_a_, 47_a_, and 49_a_ made of a metal such as stainless steel, with elastic members 43_b_, 45_b_, 47_b_, and 49_b_ made of butadiene rubber or the like. Note that, if the recording medium P is an image-receiving paper or the like to which ink is to be transferred, an ink film (not illustrated) is transported between the recording medium P and the heat generating part 9 of the thermal head X1 together with the recording medium P.

The platen roller 50 has a function of pressing the recording medium P onto the protective layer 25 located on the heat generating part 9 of the thermal head X1. The platen roller 50 is disposed extending in a direction orthogonal to the transport direction S, and both end portions thereof are supported and fixed such that the platen roller 50 is rotatable while pressing the recording medium P onto the heat generating part 9. The platen roller 50 includes a cylindrical shaft body 50_a_ made of a metal such as stainless steel and an elastic member 50_b_ made of butadiene rubber or the like. The shaft body 50_a_ is covered with the elastic member 50_b_.

As described above, the power supply device 60 has a function of supplying a current for causing the heat generating part 9 of the thermal head X1 to generate heat and a current for operating the drive IC 11. The control device 70 has a function of supplying a control signal for controlling operation of the drive IC 11, to the drive IC 11 in order to selectively cause the heat generating parts 9 of the thermal head X1 to generate heat as described above.

The thermal printer Z1 performs predetermined printing on the recording medium P by selectively causing the heat generating parts 9 to generate heat with the power supply device 60 and the control device 70, while the platen roller 50 presses the recording medium P onto the heat generating parts 9 of the thermal head X1 and the transport mechanism 40 transports the recording medium P on the heat generating parts 9. Note that, if the recording medium P is image-receiving paper or the like, printing is performed onto the recording medium P by thermally transferring, to the recording medium P, an ink of the ink film (not illustrated) transported together with the recording medium P.

Variation

Figure 7:
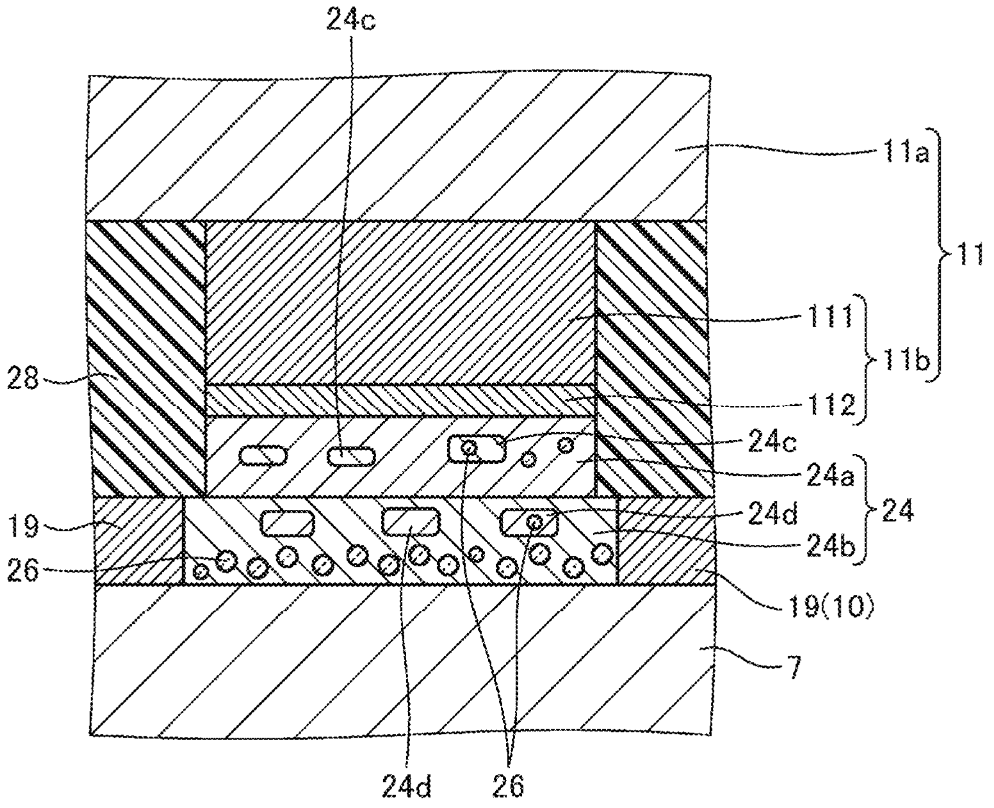
FIG. 7 is a cross-sectional view illustrating the main portion of a thermal head according to a variation of the embodiment.

A thermal head X1 according to a variation of the embodiment will be described with reference to FIG. 7. FIG. 7 is a cross-sectional view illustrating the main portion of a thermal head according to a variation of the embodiment.

In the embodiment described above, the first region 24_a_ and the second region 24_b_ of the bonding material 24 are located side by side in a layer. On the other hand, the bonding material 24 may include one or more third regions 24_c_ located inside the first region 24_a_ as illustrated in FIG. 7. The third region 24_c_ has a higher content of gold than the first region 24_a_. The bonding material 24 including the third region 24_c_ can have a reduced specific resistance.

The bonding material 24 may include one or more fourth regions 24_d_ located inside the second region 24_b_. The fourth region 24_d_ has a higher content of tin than the second region 24_b_. As the bonding material 24 includes the fourth region 24_d_ in this manner, the melting point of the bonding material 24 decreases, and the filling ability of the bonding material in the recessed portions 72 of the substrate 7 are improved.

The glass component 26 is located in the second region 24_b_ in the embodiment described above. On the other hand, the bonding material 24 may contain the glass component 26 in the first region 24_a_, the third region 24_c_, and the fourth region 24_d_. As the glass component 26 is located throughout the bonding material 24 in this way, for example, the bonding material 24 has an increased strength. For this reason, breakage of the bonding material 24 fixing the drive IC 11 is less likely to occur. As a result, the thermal head X1 according to the present variation has improved durability.

Although the embodiments and the variations of the present disclosure have been described above, the present disclosure is not limited to the embodiments described above, and various modifications can be made without departing from the spirit thereof. For example, although a planar head in which the heat generating part 9 is located on the main surface of the substrate 7 has been described, an end-surface head in which the heat generating part 9 is located on an end face of the substrate 7 may be employed.

Although description has been made using a so-called thick film head including the heat generating resistor 15 formed by printing, the present disclosure is not limited to a thick film head. A thin film head including the heat generating resistor 15 formed by sputtering may be used.

The material of the underfill material 28 covering the bonding material 24 and the terminal portion 11*b* may be the same as that of the covering member 29 covering the drive IC 11.

The connector 31 may be electrically connected to the head base 3 directly without providing the FPC 5. In this case, a connector pin (not illustrated) of the connector 31 may be electrically connected to the electrode pad 10.

Although the thermal head X1 including the covering layer 27 is exemplified, the covering layer 27 may not be necessarily provided. In this case, the protective layer 25 may extend to the region in which the covering layer 27 could be provided.

Although the bonding material 24 is located between the substrate 7 and the terminal portion 11*b* in the above description, for example, a portion of the bonding material 24 may be located between the individual electrodes 19 and the element portion 11*a*.

Although the recessed portions 241 and the protruding portions 242 of the bonding material 24 adhere to the corresponding protruding portions 71 and recessed portions 72 of the substrate 7 in the above description, the present disclosure is not limited thereto, and a space may be provided between the bonding material 24 and the substrate 7. For example, the space may be smaller than the gap 20 between the individual electrode 19 and the substrate 7. Thus, appropriate adhesiveness between the bonding material 24 and the substrate 7 can be ensured.

Although the electrode pad 10 is formed of the same material as the corresponding individual electrode 19 or the first electrode 12 in the above description, the present disclosure is not limited thereto, and the electrode pad may be formed of, for example, the same material as the bonding material 24. The electrode pad 10 need not be located at the end portion of the individual electrode 19 and the first electrode 12.

Further effects and variations can be readily derived by those skilled in the art. Thus, a wide variety of aspects of the present disclosure are not limited to the specific details and representative embodiments represented and described above. Therefore, various changes can be made without departing from the spirit or scope of the general inventive concepts defined by the appended claims and their equivalents.

REFERENCE SIGNS

X1 Thermal head
Z1 Thermal printer
1 Heat dissipation body
3 Head base
7 Substrate
9 Heat generating part
10 Electrode pad
11 Drive IC
12 First electrode
14 Second electrode
15 Heat generating resistor
17 Common electrode
19 Individual electrode
24 Bonding material
25 Protective layer
26 Glass component
27 Covering layer
28 Underfill material
29 Covering member

The invention claimed is:

1. A thermal head, comprising:
a substrate;
a bonding material located on the substrate and containing gold and tin;
an electrically conductive member located on the bonding material; and
a gold electrode located on the substrate and electrically connected to the bonding material, wherein
the substrate comprises a plurality of protruding portions facing the gold electrode and the bonding material, and
the bonding material comprises a recessed portion at a periphery of each of the plurality of protruding portions.

2. The thermal head according to claim 1, further comprising a gap between the substrate and the gold electrode.

3. The thermal head according to claim 1, wherein the bonding material comprises a first region having a higher content of tin than the gold electrode, and a second region having a higher content of gold than the first region.

4. The thermal head according to claim 3, wherein the bonding material further comprises a third region located inside the first region, the third region having a higher content of gold than the first region.

5. The thermal head according to claim 3, wherein the bonding material further comprises a fourth region located inside the second region, the fourth region having a higher content of tin than the second region.

6. The thermal head according to claim 3, wherein the bonding material comprises a glass component inside the second region.

7. The thermal head according to claim 1, wherein the electrically conductive member has a thickness greater than an interval between the substrate and the electrically conductive member.

8. The thermal head according to claim 1, wherein the electrically conductive member comprises a first layer containing copper.

9. The thermal head according to claim 8, wherein the electrically conductive member comprises a second layer located closer to the substrate than the first layer and containing nickel.

10. A thermal printer, comprising:
the thermal head according to claim 1;
a transport mechanism transporting a recording medium on a heat generating part located on the substrate; and
a platen roller pressing the recording medium onto the heat generating part.

11. A thermal head, comprising:
a substrate;
a bonding material located on the substrate and containing gold and tin;
an electrically conductive member located on the bonding material; and
a gold electrode located on the substrate and electrically connected to the bonding material, wherein the substrate comprises a plurality of recessed portions facing the gold electrode and the bonding material, and the bonding material comprises a protruding portion in each of the plurality of recessed portions.

12. The thermal head according to claim 11, further comprising a gap between the substrate and the gold electrode.

13. The thermal head according to claim 11, wherein the bonding material comprises a first region having a higher content of tin than the gold electrode, and a second region having a higher content of gold than the first region.

14. The thermal head according to claim 13, wherein the bonding material further comprises a third region located inside the first region, the third region having a higher content of gold than the first region.

15. The thermal head according to claim 13, wherein the bonding material further comprises a fourth region located inside the second region, the fourth region having a higher content of tin than the second region.

16. The thermal head according to claim 13, wherein the bonding material comprises a glass component inside the second region.

17. The thermal head according to claim 11, wherein the electrically conductive member has a thickness greater than an interval between the substrate and the electrically conductive member.

18. The thermal head according to claim 11, wherein the electrically conductive member comprises a first layer containing copper.

19. The thermal head according to claim 18, wherein the electrically conductive member comprises a second layer located closer to the substrate than the first layer and containing nickel.

20. A thermal printer, comprising:

the thermal head according to claim 11;

a transport mechanism transporting a recording medium on a heat generating part located on the substrate; and a platen roller pressing the recording medium onto the heat generating part.

* * * * *